United States Patent [19]
Conner

[11] 4,000,398
[45] Dec. 28, 1976

[54] METHOD AND APPARATUS FOR ANALYZING HARVESTER EFFICIENCY

[75] Inventor: Charles C. Conner, Portland, Oreg.

[73] Assignee: Conner Industrials, Inc., Beaverton, Oreg.

[22] Filed: Nov. 12, 1973

[21] Appl. No.: 414,914

[52] U.S. Cl. .......................... 235/92 PK; 235/92 R
[51] Int. Cl.² ........................................ G06M 7/00
[58] Field of Search ......... 235/92 PK, 92 DN, 98 B

[56] References Cited
UNITED STATES PATENTS

| | | | |
|---|---|---|---|
| 2,914,246 | 11/1959 | Beamish | 235/92 PK |
| 3,422,776 | 1/1969 | Gregory | 235/98 B |
| 3,527,928 | 9/1970 | Ryder | 235/98 B |
| 3,558,004 | 1/1971 | Boyd | 235/92 PK |
| 3,632,918 | 1/1972 | Anson | 235/92 PK |
| 3,662,158 | 5/1972 | Wong | 235/92 DN |
| 3,694,630 | 9/1972 | Dybel | 235/92 PK |

Primary Examiner—Joseph M. Thesz
Attorney, Agent, or Firm—Oliver D. Olson

[57] ABSTRACT

Kernels of grain or other particulate harvester product, trapped with chaff and other trash being returned to the ground, are caused to drop onto an impact-sensitive transducer which thereupon produces corresponding electric signals which are counted and related to harvester ground speed and header width to provide a read-out of quantity per area of particulate product lost.

11 Claims, 3 Drawing Figures

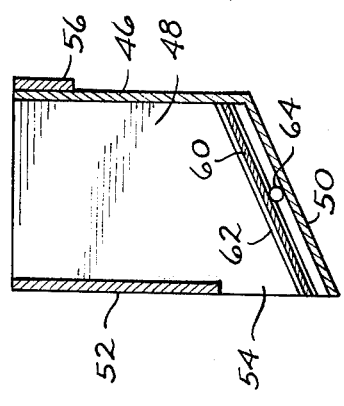
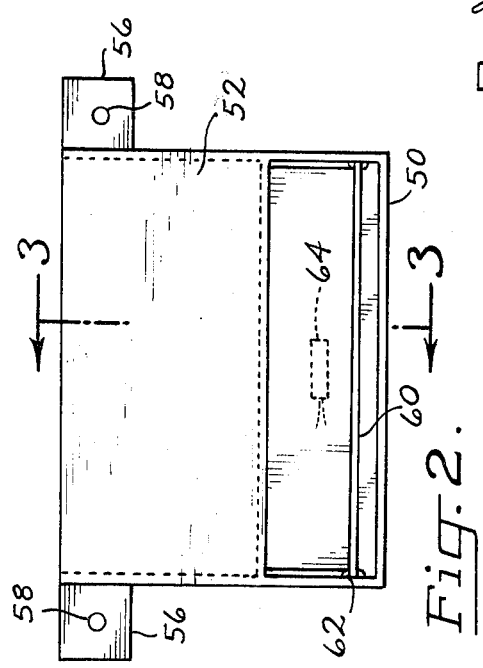
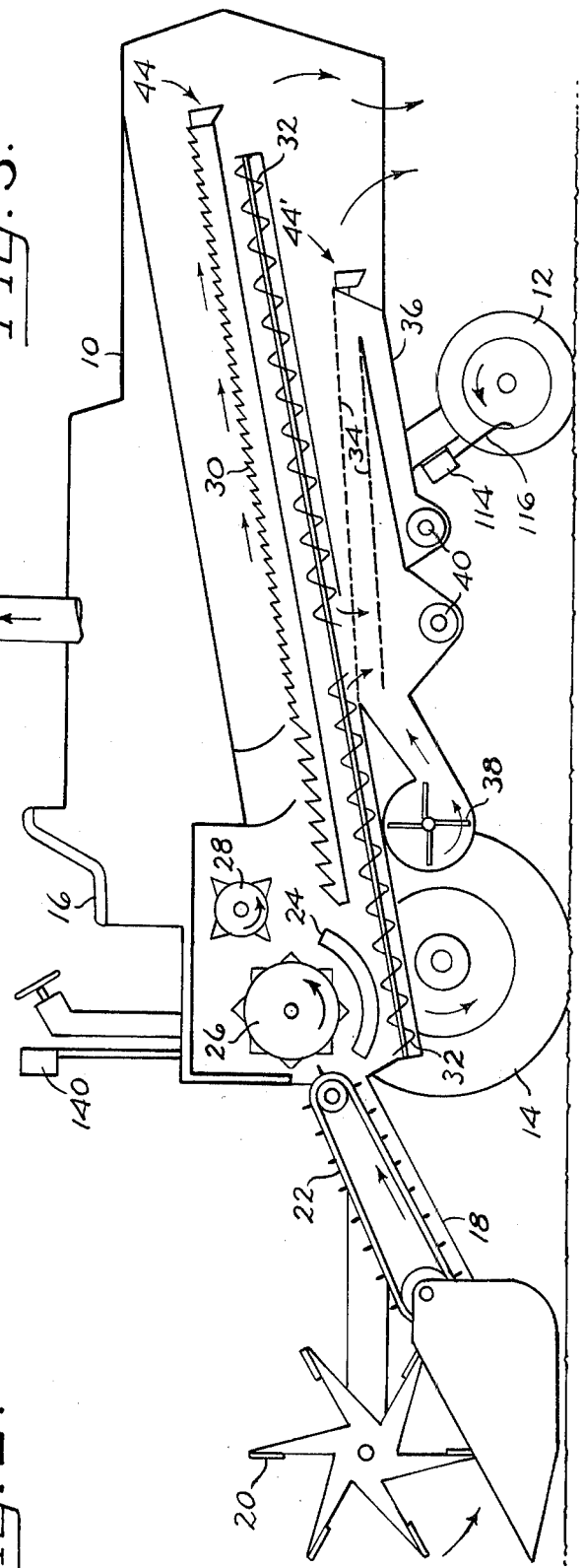

METHOD AND APPARATUS FOR ANALYZING HARVESTER EFFICIENCY

BACKGROUND OF THE INVENTION

This invention relates to the separation of a desired particulate material from a mixture of materials, and more particularly to method and apparatus for analyzing the efficiency of harvesting a particulate food product.

Harvesters for grains and other particulate food products include components which are adjustable in order to achieve maximum efficiency of product recovery. In a grain harvester, for example, such adjustable components include platform reel, shelling cylinder, straw walkers and sieves, air blower, concave to cylinder spacing, and others. These are adjusted selectively while periodically determining the amount of grain returned to the ground with the chaff, straw and other trash.

In the harvesting of grain, for example, it has been the general practice heretofore that kernels trapped with trash either are manually counted on the ground within a given area, or are manually caught up and counted in a basket or other container as they are expelled toward the ground over a given distance of travel of the harvester, and then in either case the count is converted to bushels per acre of grain loss. This laborious and time consuming procedure characteristically requires as much as two days of harvesting to reach optimum adjustment of harvester components to achieve minimum grain loss. By that time it frequently occurs that harvesting has reached a field of different character whereby the procedure must be repeated. In any event, the labor time and intervening loss of grain represent substantial cost factors of production.

A grain monitor has been proposed in which the sounds of grain falling on a sounding board are picked up by a microphone and the resulting electric signals are amplified and applied to a meter to give an indication of a volume of grain being lost. This monitor requires an extensive and costly filtering system for removing unwanted electric signals due to the extraneous noises developed by straw and other debris and by the harvester itself, and the degree of accuracy of indication of quantity of loss per acre is less than desirable.

SUMMARY OF THE INVENTION

In its basic concept, this invention involves the dropping of particulate material to be counted upon a transducer capable of converting the impact energy of each particle dropped upon the transducer to an electric signal, and counting said electric signals over a period of time.

It is by virtue of the foregoing basic concept that the principal objective of this invention is achieved; namely, to overcome the aforementioned disadvantages of prior methods and apparatus for analyzing the efficiency of harvesters and other types of separators.

Another important object of this invention is the provision of method and apparatus for analyzing harvester efficiency by which there is obtained a direct read-out of quantity per area of particulate harvester product lost in the separation.

A further important object of this invention is the provision of method and apparatus for analyzing harvester efficiency by means of which rapid and precise adjustments of harvester components are afforded with consequent significant increase in efficiency in harvesting.

Still another important object of this invention is the provision of apparatus for analyzing harvester efficiency, which apparatus is of simplified construction for economical manufacture, is adaptable for use with a wide variety of commercially available harvesters of various types and sizes and provides precise and faithful operation over extended periods of time with minimum maintenance.

The foregoing and other objects and advantages of this invention will appear from the following detailed description, taken in connection with the accompanying drawings of a preferred embodiment.

BRIEF DESCRIPTION OF THE DRAWINGS

FIG. 1 is a view in longitudinal section of a conventional grain combine harvester having incorporated therewith harvester efficiency analyzing apparatus embodying the features of this invention.

FIG. 2 is a view in rear elevation of an impact sensing component of the analyzing apparatus.

FIG. 3 is a sectional view taken on the line 3—3 in FIG. 2.

DESCRIPTION OF THE PREFERRED EMBODIMENT

Figure 4:
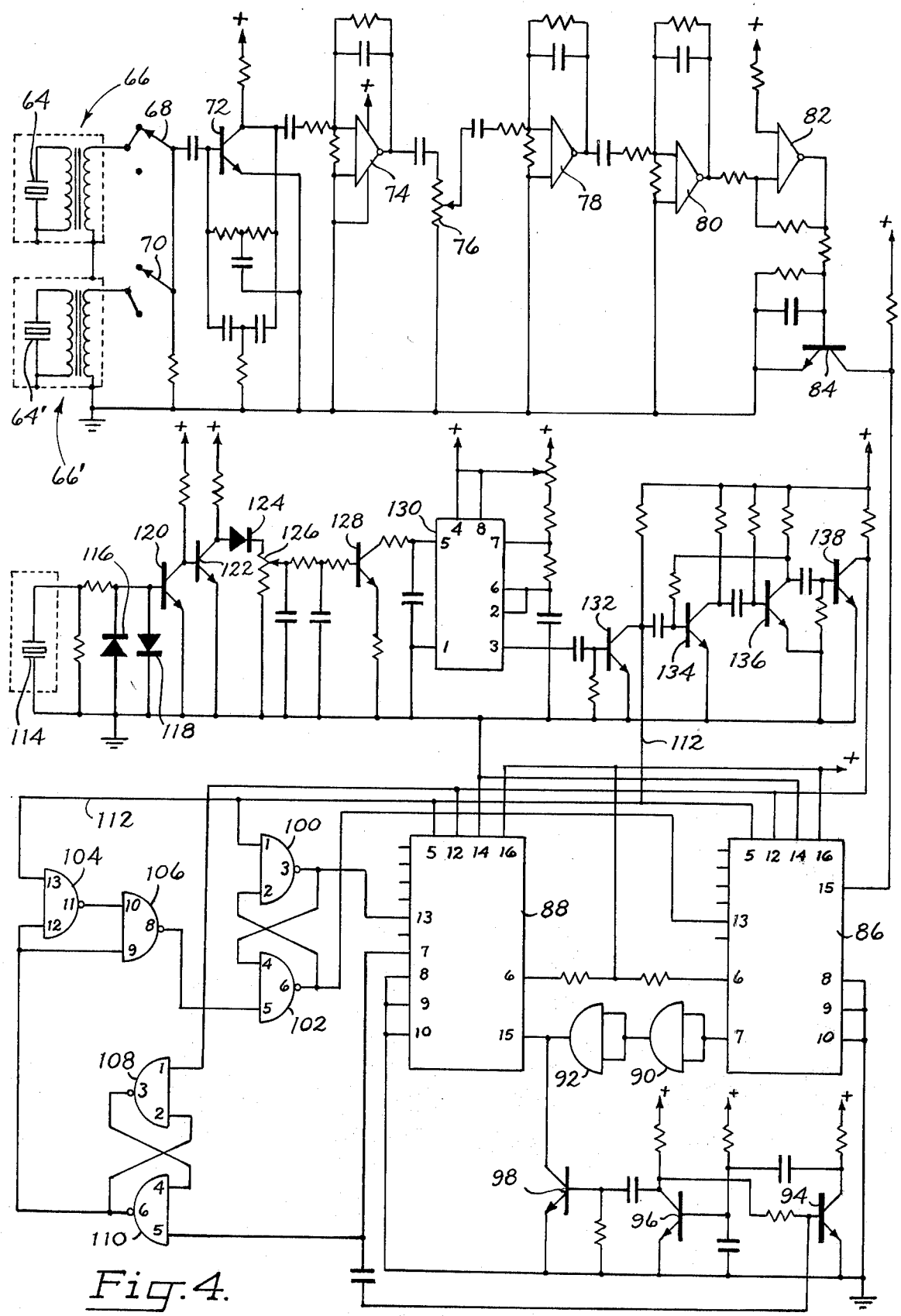
FIG. 4 is a schematic diagram of electrical circuitry for use in the apparatus of this invention.

For purposes merely of description of this invention, FIG. 1 illustrates a conventional combine harvester which includes a frame-supported housing 10 mounted on laterally spaced rear idler wheels 12 and laterally spaced front driven wheels 14, the power source for which (not shown) is controlled by an operator located in the operator's seat 16.

Projecting forwardly from the housing is a header frame 18 which is adjustable vertically, while the rotary cutter 20 and conveyor 22 thereof are adjustable rotationally. Within the housing adjacent the outfeed of the header conveyor is a concave 24 which is adjustable toward and away from an associated shelling cylinder 26, the rotational speed of which is also adjustable. The outfeed from the concave is delivered, by means of a rotary deflector 28, to the infeed end of a longitudinally elongated straw walker assembly 30 which is inclined upwardly toward the rear of the housing from whence straw or other bulk trash is expelled back to the ground. The straw walker assembly overlies an auger system 32 which delivers the grain or other particulate food product, together with chaff or other finely divided debris to a vibrating sieve system 34 within a cleaning shoe 36. An air blower 38, associated with the sieve system, effectively removes the chaff and other fine debris therefrom and discharges it rearwardly from the rear end of the cleaning shoe to the ground. The separated grain or other particulate food product passe through the sieve system and is delivered by conveyor means 40 to a product outlet 42.

As explained hereinbefore, a proportion of the grain or other particulate food product is trapped with the straw and also with the finer debris and is discharged therewith back to the ground. In order to minimize this loss of particulate food product, the operator is provided with controls by which to adjust selectively the elevation of the header frame, the rotational speed of the header components 20 and 22, the spacing of the concave 24 relative to the shelling cylinder 26, the rotational speed of the shelling cylinder, the speed of reciprocation of the straw walker assembly 30 and sieve assembly 34, the rotational speed of the air blower 38 and, of course, the ground speed of the vehicle. By means of these various adjustments the operator ultimately is able to achieve maximum efficiency of harvester operation, as represented by minimum loss of particulate food product back to the ground.

This invention provides a method and apparatus by which the operator is afforded a direct, continuous read-out of the quantity of particulate food product discharged back to the ground with the trash, whereby to enable the operator rapidly to make the necessary adjustments to minimize the loss.

Thus, in accordance with the illustrated embodiment of this invention, there is mounted at the rearward end of the straw walker assembly 30 and at the rearward end of the cleaning shoe 36 a sensing unit 44 and 44', respectively, positioned to intercept at least a portion of the trash and entrapped particulate food product being discharged to the ground. In the embodiment illustrated, each sensing unit comprises a hollow housing (FIGS. 2 and 3) having a front wall 46, side walls 48, rearwardly inclined bottom wall 50 and partial rear wall 52 which terminates above the rearward end of the bottom wall to provide an outlet opening 54. The housing is attached to the rearward end of the straw walker or cleaning shoe by such means as lateral tabs 56 provided with openings 58 for the reception of screws or bolts.

Within the housing and spaced slightly upward from the bottom wall 50 is a transducer impact plate 60. This plate slopes downwardly toward the rear, to allow the trash and particulate product to escape rearward through the opening 54 below the rearwall, and preferably is mounted resiliently within the housing as by means of the peripheral rubber gasket 62.

Secured to the underside of the impact plate is a transducer element 64 (the transducer element associated with sensing unit 44' being designated 64' in FIG. 4) capable of converting the impact energy of each particle of grain or other particulate food product falling upon the plate 60 to an electric alternating current count signal. Accordingly, for purposes of this invention, the transducer is considered to be the combination of impact plate 60 and element 64.

A variety of types of such transducer elements are commercially available, one suitable type being the ceramic transducer available commercially as Astetic Model 89T. Transducers of this type provide an alternating current signal output having a frequency that is characteristic of the density of the particulate material impacted upon the plate 60. Thus, the transducer effectively distinguishes the particulate material from the trash, for subsequent analysis. Moreover, various types of particulate materials of different densities provide correspondingly different transducer output frequency characteristics. Accordingly, as explained hereinafter, the apparatus of this invention is adjustable to be responsive to a predetermined frequency, whereby to accommodate the use of the apparatus in analyzing the separator efficiency of operation on a wide variety of particulate materials.

Referring now primarily to FIG. 4 of the drawings, the transducers 64 and 64' are connected across the primary windings of separate transformers 66 and 66', respectively, the secondary windings of which are connected at one end to selector switches 68 and 70, respectively, by which one or both transformer outputs may be connected to subsequent circuitry. Each transformer and associated transducer are shielded, as indicated by broken lines.

During adjustment of the harvester components, the operator may manipulate the switches 68 and 70 for most effective monitoring. Thus, during adjustment of the harvester components relating to the straw walker 30, the positions of the switches will be as shown in FIG. 4. During adjustment of the harvester components associated with the cleaning shoe 36, switch 68 will be transferred to the open position and switch 70 will be transferred to the closed position. During normal operation of the harvester, both of the switches usually will be closed, whereby to monitor both straw walker and cleaning shoe assemblies.

The transformer output is coupled through a bridged T active filter, formed of a transistor 72 and the associated RC filter network, to the input of an operational current amplifier 74, for example of the Norton type. The bridged T active network functions to filter out high and low frequencies, leaving a desired narrow frequency band which is peaked, for example, at about 8Kh. Further frequency selectivity is afforded by the feedback network associated with the amplifier.

The alternating current voltage output from the amplifier 74 is applied to a calibration potentiometer 76 which functions to select the number of alternating current cycles to be applied to subsequent circuitry. It is by this means that the width of the impact plate 60 may be but a fraction of the total width of the straw walker and cleaning shoe. Thus, for example, if the width of the straw walker and cleaning shoe is five feet and the width of the impact plate is chosen to be one foot, then the calibration potentiometer 76 is adjusted to pass the first five cycles only of the alternating current voltage resulting from the impact of a single kernel or other particle upon the plate 60.

The alternating current output is applied to a second operational amplifier 78 and thence, preferably, through a third operational amplifier 80. These amplifiers, by virtue of their associated feedback networks, function additionally as active filters, to achieve maximum selectivity of desired frequency. The output of the third amplifier 80 is applied to a Schmitt trigger 82 to provide a positive square wave output.

Conveniently, the components 74, 78, 80 and 82 may be provided by use of integrated circuit Model LM 3900 manufactured by National Semi-Conductor Corp.

The output of the Schmitt trigger is applied to an inverter transistor 84 which performs the dual function of reducing the voltage level to a value, for example 5 volts, suitable for use in subsequent circuitry, and also of inverting the square wave signal for application as a count-up signal to the integrated circuit lead read-out 86, at pin 15, for a first significant figure. This read-out, as well as the read-out 88 for the second significant figure, are self-contained counters, latches, seven segment decoders and seven segment drivers, and the pin designations illustrated are those for the TIL-6 model manufactured by Texas Instruments, Inc.

The maximum count output (pin 7) of integrated circuit lead read-out 86, is connected to the count-up signal input (pin 15) of lead read-out 88 by means of a dual inverter nand circuit 90, 92. This is illustrated in the drawing as one-half of integrated circuit Model No. SN 7400 manufactured bu Texas Instruments, Inc. The maximum count output (pin 7) of integrated circuit lead read-out 88 is coupled to the count-up signal input thereof through a signal delay circuit network formed of transistors 94, 96 and 98. This network functions to provide an extra input pulse to the read-out 88, delayed in time relative to the input pulse from the nand circuit 90, 92 sufficiently to effect appropriate count with movement of the decimal point, when the count moves from 0.99 to 1.0.

The nand gates 100 and 102, which are the remaining half of the integrated circuit containing the nand gates 90 and 92, and the similar nand gates 104, 106, 108 and 110 of an identical integrated circuit, function to store the decimal point in its proper position with each stored piece of information. These nand gates are activated by control strobe pulses applied thereto through line 112, and the resulting stored decimal point signal outputs from the nand gates 100 and 102 are applied to the decimal point signal inputs (pins 13) of the read-outs 86 and 88.

The strobe pulses are generated on a time interval which is related to the movement of the separator which, in the embodiment illustrated, is the ground speed of the harvester. For this purpose, a transducer 114 such as Astetic model 89T, is mounted on the harvester. It is connected to one end of an elongated metal probe 116 (FIG. 1) the opposite end of which is disposed in sliding contact with one of the idler wheels 12 of the harvester, whereby noise signals generated by the sliding contact of the probe on the idler wheel are converted into corresponding alternating current voltage control signals.

Other types of transducers also are suitable for this purpose. One such type is the magnetic sending unit Model No. 7EP205W manufactured by Motorola, Inc.

The alternating current control signals from the transducer 114 are put through a diode window formed of the diodes 116 and 118 to provide a constant amplitude voltage. This voltage is applied to transistor 120 the amplification of which is dependent upon the spacing of the noise pulses. Further amplification is afforded by transistor 122 and then the control signals are passed through a diode 124 for rectification. A portion of the rectified signal, selected by adjustment of the calibration potentiometer 126 to represent a desired ground speed, then is amplified by direct current amplifier transistor 128 and applied (pin 5) to the integrated circuit time base pulse generator 130. In the embodiment illustrated, the pin designations conform to those of a negative triggered timer provided by integrated circuit Model NE555 manufactured by Signetics, Inc.

The amplified direct current output from transistor 128 functions to modulate the timer 130. Thus, as the ground speed of the harvester increases, more noise pulses are generated and hence the increase in direct current voltage increases the modulation voltage, resulting in an increase in pulse rate from the timer output (pin 3).

The output pulses from the timer 130 are amplified and inverted at transistor 132 and supplied through the line 112 to the decimal point storage gates described hereinbefore.

The strobe pulses from transistor 132 also are applied through a delay network, formed of transistors 134, 136 and 138, to read-out circuits 86 and 88 (pins 12) and the nand gate 108, to provide clear pulses. These clear pulses clear the strobe pulses in the counter and the latch, but do not clear the read-out circuit. Thus, the strobe pulses transfer the information from storage to read-out, and then the delayed clear pulses clear the storage system in the counter so that the counting sequence can be repeated on a timed cycle corresponding to the ground speed of the harvester.

For example, at about one mile per hour ground speed, the clear pulses rate is approximately 0.9 second, whereas at about 6 miles per hour the pulse rate is approximately 0.3 second. These times represent a complete cycle of read-out.

The integrated circuit read-outs 86 and 88, and the associated circuitry illustrated in FIG. 4, is contained in a housing 140 (FIG. 1) which is positioned for convenient viewing by the operator in the seat 16.

In the illustrated embodiment, wherein the apparatus is utilized to analyze the efficiency of the harvester, the digital read-out provided by the integrated circuits 86 and 88 is rendered substantially continuously (on a repeat cycle of less than one second), and preferably in terms of bushels per acre of grain trapped with the straw and other debris and returned back to the ground. Thus, the operator may adjust the various operating components of the harvester selectively with the view toward reducing the magnitude of the digital read-out to a minimum. It has been found in actual practice that such minimum read-out, and hence minimum loss of grain back to the ground, can be achieved by harvester adjustments completed within the time span of travel of the harvester over about 100 yards, as compared with up to about two days under prior procedures.

Further, because of the speed with which harvester components may be adjusted to achieve minimum grain loss, the ground speed of the harvester may be increased by a factor of three or four times normal harvester speed. Thus, whereas harvester ground speed heretofore has been limited to a maximum of about 1.5 miles per hour, the apparatus of this invention accommodates harvester ground speeds in excess of five miles per hour. Accordingly, this invention contributes significantly to increased harvesting rates as well as harvesting efficiency.

It will be appreciated that the method and apparatus of this invention is adaptable for use in analyzing the efficiency of a wide variety of types of separators in which a particulate material of a given density is to be separated from other materials of different densities. For example, if the mixture of materials is conveyed to a separator on a moving conveyor, the control transducer 114 may be mounted for engagement with the conveyor to provide control strobe and clear pulses representative of the speed of movement of the conveyor.

Further, the method and apparatus of this invention is adaptable for use in counting particles of particulate material in the absence of other material. Thus, for example, the invention may be employed to count seeds as they are delivered for planting in the ground.

It will be apparent to those skilled in the art that various changes may be made in the method steps and in the size, type, number and arrangement of parts of the apparatus described hereinbefore, without departing from the spirit of this invention.

Having now described my invention and the manner in which it may be used, I claim:

1. The method of counting particles of particulate material, comprising a. dropping the particles onto a count transducer capable of converting the impact energy of each particle falling upon the count transducer to an electric alternating current count signal having a frequency that is characteristic of the density of said particulate material, and b. counting only said electric count signals.

2. The method of claim 1 for analyzing the efficiency of operation of a separator for separating a particulate material from other material of different density, wherein the separator has outfeed means for said other material, the method comprising:

c. positioning adjacent said outfeed means a count transducer capable of converting the impact energy of each particle of said particulate material falling upon the count transducer to an electric alternating current count signal having a frequency that is characteristic of the density of said particulate material, and d. counting said electric count signals over a period of time to obtain a measure of the number of particles of said particulate material discharged with said other material from the outlet means in said period of time.

3. Apparatus for counting particles of particulate material, discharged from outfeed means, comprising a. a count transducer mounted adjacent the outfeed means for impact thereon of particulate material falling from said outfeed means, the count transducer being capable of converting the impact energy of each particle of said particulate material to an electric alternating current count signal having a frequency that is characteristic of the density of said particulate material, and b. counter means connected to the count transducer for counting only said count signals.

4. The apparatus of claim 3 for analyzing the efficiency of operation of a separator for separating a particulate material from other material of different density, wherein the outfeed means is for said other material, the count transducer provides a count signal having a frequency characteristic of the density of said particulate material, and the counter means counts said signals over a predetermined period of time.

5. The method of analyzing the efficiency of operation of a separator for separating a particulate material from other material of different density, wherein the separator has outfeed means for said other material, the method comprising:

a. positioning adjacent said outfeed means a count transducer capable of converting the impact energy of each article of said particulate material falling upon the count transducer to an electric alternating current count signal having a frequency that is characteristic of the density of said particulate material, the width of the outfeed means being greater than the width of the count transducer by a predetermined factor, b. selecting for counting from each alternating current count signal the same number of cycles thereof as said predetermined factor, and c. counting said numbers of cycles over a period of time to obtain a measure of the number of particles of said particulate material discharged with said other material from the outlet means in said period of time.

6. The method of claim 5 wherein the separator includes a rotary member that rotates in proportion to movement of the material to be separated, the method including d. associating the rotary member with a control transducer capable of converting rotary motion of said rotary member to electric alternating current control signals proportional to the rotational speed of said rotary member, and e. utilizing said control signals to effect the counting of counts signals over a predetermined period of time representing a speed of travel of the material, whereby the number of count signals represents a quantity of particles counted per unit of time.

7. The method of claim 5 wherein the separator is a harvester movable over the ground and includes a rotary member that rotates in proportion to said movement over the ground, the method including d. associating the rotary member with a control transducer capable of converting rotary motion of said rotary member to electric alternating current control signals proportional to the ground speed of the harvester, and e. utilizing said control signals to effect the counting of count signals over a predetermined period of time representing a speed of travel of the harvester over the ground, whereby the number of count signals represents a quantity of particles counter per unit of area covered by movement of the harvester.

8. Apparatus for analyzing the efficiency of operation of a separator for separating a particulate material from other material of different density, wherein the separator has outfeed means for said other material, the apparatus comprising:

a. a count transducer mounted adjacent the outfeed means for impact thereon of particulate material falling from said outfeed means, the count transducer being capable of converting the impact energy of each particle of said particulate material to an electric alternating current count signal having a frequency that is characteristic of the density of said particulate material, the width of the outfeed means being greater than the width of the count transducer by a predetermined factor, b. counter means connected to the count transducer for counting only said count signals over a predetermined period of time, and c. means interposed between the count transducer and counter means for selecting for counting from each alternating current count signal the same number of cycles thereof as said predetermined width factor.

9. The apparatus of claim 8 wherein the separator includes a rotary member that rotates in proportion to movement of the material to be separated, and the apparatus includes:

d. a control transducer mounted in operative association with said rotary member and capable of converting rotary motion of said rotary member to electric alternating current control signals proportional to the rotational speed of said rotary member, and e. means connecting the control transducer to the counter means for resetting the latter to zero after a predetermined period of time, whereby to effect the periodic recounting of said count signals.

10. The apparatus of claim 8 wherein the separator is a harvester movable over the ground and includes a rotary member that rotates in proportion to said movement over the ground, and the apparatus includes d. a control transducer mounted in operative association with said rotary member and capable of converting rotary motion of said rotary member to electric alternating current control signals proportional to the ground speed of the harvester, and e. means connecting the control transducer to the counter means for resetting the latter to zero after a predetermined period of time, whereby to effect the periodic recounting of said count signals.

11. The apparatus of claim 10 wherein the counter means provides a digital read-out of quantity of particles of said particulate material per area covered by movement of the harvester.

* * * * *